United States Patent
Winner et al.

(10) Patent No.: US 6,496,770 B2
(45) Date of Patent: Dec. 17, 2002

(54) METHOD AND APPARATUS FOR CONTROLLING THE TRAVEL SPEED OF A VEHICLE

(75) Inventors: Hermann Winner, Karlsruhe (DE); Jens Lueder, Kornwestheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/771,291

(22) Filed: Jan. 26, 2001

(65) Prior Publication Data

US 2001/0027371 A1 Oct. 4, 2001

(30) Foreign Application Priority Data

Mar. 28, 2000 (DE) .......................... 100 15 300

(51) Int. Cl.$^7$ .................. G06K 9/00; G01S 13/93; G06F 7/00
(52) U.S. Cl. .................. 701/96; 701/20; 701/45; 701/70; 340/435; 340/436; 340/937; 340/903; 340/988; 340/991; 180/167; 180/169; 180/271; 180/168; 342/457; 342/170; 342/71; 342/72; 342/73; 342/146; 356/5.01; 356/4.01
(58) Field of Search .................. 340/937, 435, 340/903, 988, 991, 436; 701/96, 70, 45, 20; 180/167, 169, 271, 168, 197, 268, 274, 177; 342/457, 170, 71, 72, 73, 107, 146; 356/5.01, 4.01

(56) References Cited

U.S. PATENT DOCUMENTS

| | | | | |
|---|---|---|---|---|
| 5,343,206 A | * | 8/1994 | Ansaldi et al. | 342/179 |
| 5,684,473 A | * | 11/1997 | Hibino et al. | 180/271 |
| 5,689,264 A | * | 11/1997 | Ishikawa et al. | 342/70 |
| 5,818,355 A | * | 10/1998 | Shirai et al. | 180/167 |

(List continued on next page.)

FOREIGN PATENT DOCUMENTS

| | | |
|---|---|---|
| DE | 196 27 727 A1 | 1/1998 |
| DE | 196 40 694 A1 | 4/1998 |
| DE | 197 57 062 A1 | 6/1999 |
| DE | 196 37 245 C2 | 2/2000 |

OTHER PUBLICATIONS

"Adaptive Cruise Control–System Aspects and Development Trends", Winner, Witte et al, SEA 96, DEB. 26–29 1996, Paper No. 96 10 10, pp. 27–36.

Primary Examiner—William A. Cuchlinski, Jr.
Assistant Examiner—Ronnie Mancho
(74) Attorney, Agent, or Firm—Michael J. Striker

(57) ABSTRACT

The method of controlling travel speed of a vehicle includes controlling vehicle travel speed according to a set vehicle speed given by a driver of the controlled vehicle in a speed control mode; detecting at least one object present in front of the controlled vehicle and measuring distance to and relative speed of the at least one object when present in front of the controlled vehicle; determining whether or not a preceding vehicle is among the at least one object present in front of the controlled vehicle; controlling the vehicle travel speed according to a set distance to the preceding vehicle in a distance control mode when the preceding vehicle is present in front of the controlled vehicle; establishing whether or not a stationary object is among the at least one object present in front of the controlled vehicle; when a stationary object is found to be present, calculating a predicted travel path of the controlled vehicle and determining if the stationary object is located in the predicted travel path; when the stationary object is in the predicted travel path, calculating a relevance value (REL) of the stationary object as an obstacle for the controlled vehicle and limiting vehicle acceleration of the controlled vehicle according to the relevance value (REL) of the stationary object as an obstacle. An apparatus for performing the method is described. The apparatus includes a radar detector and a connected microcomputer.

7 Claims, 3 Drawing Sheets

U.S. PATENT DOCUMENTS 5,959,552 A * 9/1999 Cho .......................... 180/167
6,226,389 B1 * 5/2001 Lemelson et al. .......... 382/104
6,282,483 B1 * 8/2001 Yano et al. ................. 340/435
6,311,121 B1 * 10/2001 Kuragaki et al. ........... 180/167

* cited by examiner

METHOD AND APPARATUS FOR CONTROLLING THE TRAVEL SPEED OF A VEHICLE

BACKGROUND OF THE INVENTION

1. Field of the Invention

The present invention relates to a method and apparatus for controlling the travel speed of a vehicle, in which the distance and relative speed of objects located in front of the vehicle are measured and the vehicle travel speed is regulated according to a set vehicle travel speed in a speed control mode and according to a predetermined set distance to a preceding vehicle in a distance control mode.

2. Prior Art

Processes and apparatuses of this type are known and designated "adapative vehicle travel speed controller" and with the abbreviation "ACC", which means adaptive cruise control and are described, for example, in the article entitled "Adaptive Cruise Control-System aspects and Development Trends" of Winner, Witte, et al., published in SAE 96, Detroit, 26.–29., February 1966, paper no. 96 10 10. Special aspects of this type of system are described in DE 196 27 727, DE 196 37 245 and DE 196 40 694.

For measurement of the distance and relative speed of one or more preceding vehicles a radar-based system or infrared-based system is provided in a known apparatus. The known radar-based system however not only detects the preceding vehicles, but also stationary objects, such as traffic signs and the like, which are detected by it. The relative speed of the stationary objects agrees with the actual speed of the vehicle that is known to the control system up to the sign. These stationary objects are however generally ignored in the distance regulation method, because they are not normally in the road or not in the travel path of the controlled vehicle. They are also ignored because the responsibility to avoid collisions with this sort of obstacle is left to the awareness of the driver for safety reasons in these systems, when this exceptional case arises.

In DE 197 57 062 A a situation is described in which a stationary obstacle is found on the road in front of the preceding vehicle and the preceding vehicle travels out from its line of travel in order to avoid this obstacle. Normally this has the consequence that the control system, which can no longer detect the preceding vehicle shifts from the distance control mode to the speed control mode and accelerates the vehicle to the set speed value originally set by the driver. The driver could thus be irritated because of that change and his or her comfort and safety could be impaired Thus the vehicle reacts inadequately in this situation, namely with an acceleration, although a slowing of the vehicle would be appropriate, considering the presence of the obstacle. For these reasons according to the above-named publication under these special conditions, thus during a change from the distance control mode to the speed control mode, the detected stationary object should be considered in this exceptional situation. Under this exceptional condition the inappropriate acceleration of the vehicle should be suppressed or a delay of the vehicle should be initiated. Since the described situation occurs primarily in city traffic, also at moderate speeds, the stationary objects should be considered only under the condition that the actual vehicle travel speed and also the distance to the stationary object are both below respective predetermined threshold values.

Of course in many cases an unsuitable and irritating reaction for the driver of the vehicle can be avoided, however situations can still occur, in which this known system reacts in an implausible and irritating manner for the driver. An example of one such situation would be the case in which the shift from the distance control mode to the speed control mode has already occurred earlier and the vehicle is still in an acceleration phase, during which the resting object is first located. Another example would be the situation in which the preceding vehicle passes an object that only partially extends into the travel path without leaving its travel path and the locating range of the radar system and then, after it passes the stationary object, accelerates again. In this case the system would remain in the distance control mode and the vehicle would accelerate, although it has not yet passed the stationary object. An additional example is travel path or route change to a new path in which a stationary object is found. Several known ACC system have been designed so that the driver can temporarily put the speed control out of action and the system under certain circumstances, for example after a predetermined delay time, automatically shift back into the control mode. Also under these circumstances an acceleration process takes place, which would be perceived as unsuitable or irritating considering the presence of the stationary object.

As reported by passengers in motor vehicles, many persons experience considerable discomfort, if a human driver—or an automatic system—does not react in a concrete traffic situation, as they themselves would react to it. The avoidance of situations, in which an ACC system reacts implausibly or inappropriately, is a factor, which should not be underestimated in evaluating these systems.

SUMMARY OF THE INVENTION

It is an object of the present invention to provide a method of the above-described kind for regulating the travel speed of a vehicle, which guides or conducts the vehicle in a greater variety of different vehicle travel situations in a suitable manner and/or behaves in such a manner as to increase vehicle travel safety.

It is also an object of the present invention to provide an apparatus for performing the inventive method for regulating the travel speed of the vehicle, so that the vehicle travels in a greater variety of different vehicle travel situations in an appropriate manner and/or behaves in a safer manner.

These objects and others, which will be made more apparent hereinafter, are attained in a method for controlling travel speed of a vehicle, in which the distance and relative speed of objects located in front of the vehicle, including preceding vehicles, are measured, the vehicle travel speed is controlled according to a set speed given by the driver in a speed control mode and according to a set distance to a preceding vehicle in a distance control mode and under certain circumstances, when a stationary object is detected in the path of the vehicle, the vehicle reacts so that the acceleration of the vehicle is limited.

According to the invention the reaction of the vehicle limiting its acceleration is started when a stationary object is detected in the path of the vehicle, but the extent or strength of the limitation of the acceleration varies according to an analysis of relevance of the stationary object as an obstacle for the controlled vehicle, in particular according to a calculated relevance value for the stationary object as an obstacle for the controlled vehicle.

According to the invention the apparatus reacts to objects in the path of the traveling vehicle not only during a change from the distance control mode to the speed control mode, but also within the distance control mode and within the speed control mode. Overreaction of the apparatus to the stationary object causing discomfort or danger is avoided by a quantitative analysis of the relevance of this type of stationary object as an obstacle for the vehicle. An adjustment of the extent or strength of the reaction limiting acceleration of the vehicle takes place with the aid of the analysis results.

Different criteria may be set up for calculation of the relevance value of a stationary object detected in front of the vehicle as an obstacle for the vehicle. In an especially preferred embodiment of the invention these criteria include the distance of the object from the controlled vehicle (relevance-reducing), the lateral displacement of the object from the predicted center of the vehicle travel path (relevance-reducing) and the length of the time interval, within which the object is located in the travel-path (relevance-increasing). The tendency for approximate transverse motion of the object (which is still detected as "resting" because of a nearly zero relative speed component in the travel direction) could be considered. In addition, the decrease of radar echo intensity as the vehicle approaches the object, as occurs to some extent with smaller reflecting objects in the vehicle travel path or in the plane of travel could be considered.

The adjusting or grading of the reaction of the vehicle to a stationary object in its vicinity depends on its relevance, which is evaluated with the aid of these criteria. As a result discomfort does not occur when the stationary object is far removed from the vehicle travel path or in the vehicle travel path for only a short time. A strong reaction only occurs for those objects, which are detected as in or near the center of the vehicle travel path for a significant length of time and thus appear as an obstacle.

The gentlest reaction to the stationary object arises in a preferred embodiment in which only the rate of increase of the acceleration, not the acceleration of the vehicle itself, is limited. A "back-type" acceleration of the vehicle occurs during this adaptive control so that the discomfort phenomenon may be avoided before the driver slows the vehicle because of the detected obstacle. A stronger reaction, which can be used with the same or also with a higher relevance threshold, limits the vehicle acceleration to a certain maximum value. The maximum value depends preferably on the analysis of the relevance and in an extreme case can be negative, so that the vehicle is braked. In this connection also an engagement of the braking system is conceivable to actively brake the vehicle automatically.

Other advantageous features of preferred embodiments are described in the following description and claims.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
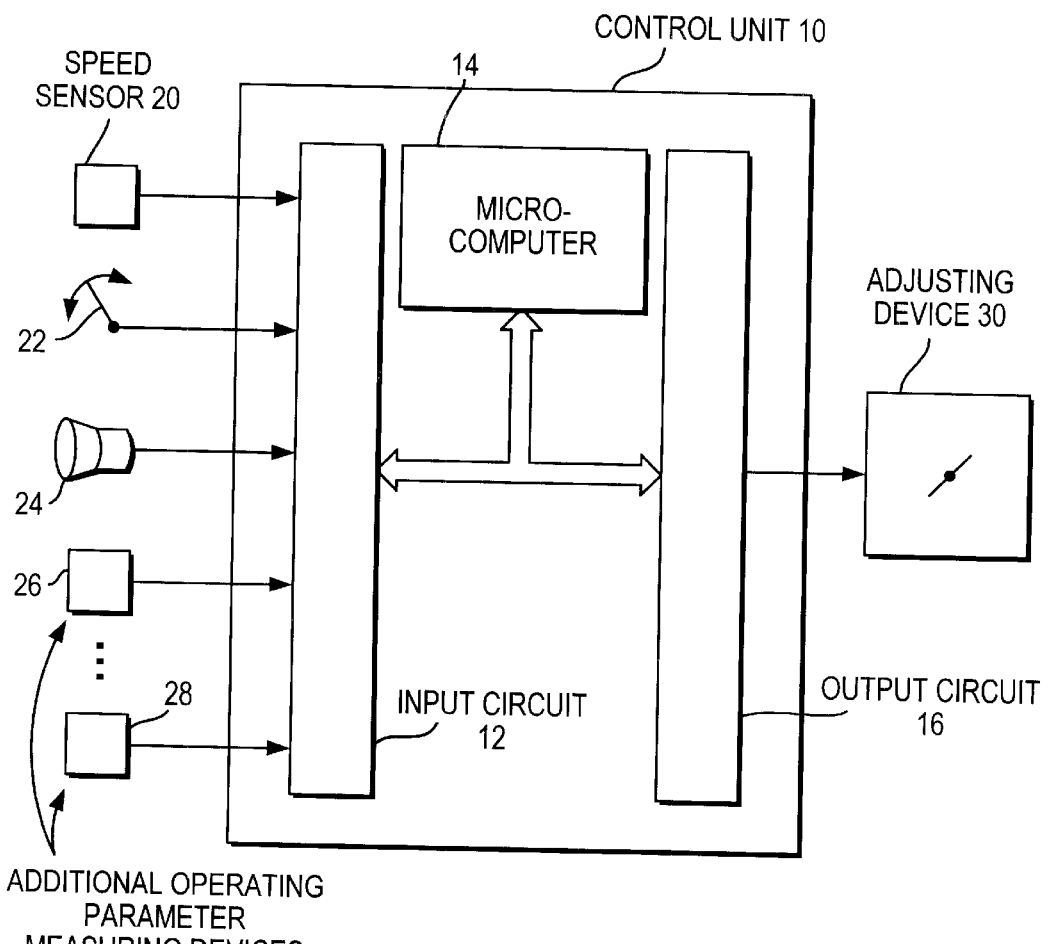
FIG. 1 is a block diagram of a control unit for control of vehicle speed according to the invention.

A control unit 10 for adaptive vehicle travel speed control of a motor vehicle, for example a PKW, is illustrated in FIG. 1. The control unit 10 comprises an input circuit or interface 12, at least one microcomputer 14 and an output circuit or interface 16, which are connected with each other by means of a communication system 18 for data exchange.

A speed-measuring device 20 for measuring the vehicle speed, a control element 22 operable by the driver, which serves to input a set vehicle speed desired by the driver and a distance-measuring device 24, preferably a radar unit, supply input signals to the input circuit 12. Also the input circuit 12 adds signals from other measuring devices 26, 28, which serve for detection of other operating parameters, which are used in the adaptive speed control method of the invention. These other operating parameters can include a steering angle, transverse acceleration and the like.

The microcomputer 14 evaluates the data input through the input circuit 12 in the course of the adaptive speed control and controls an adjusting device 30, for example an electronic motor control unit, by means of the output circuit 16. The adjusting device 30 determines or sets the engine performance of the engine and thus the vehicle acceleration (positively or if necessary negatively) by influencing or controlling the throttle position, the ignition, etc, of the vehicle engine.

Figure 2:
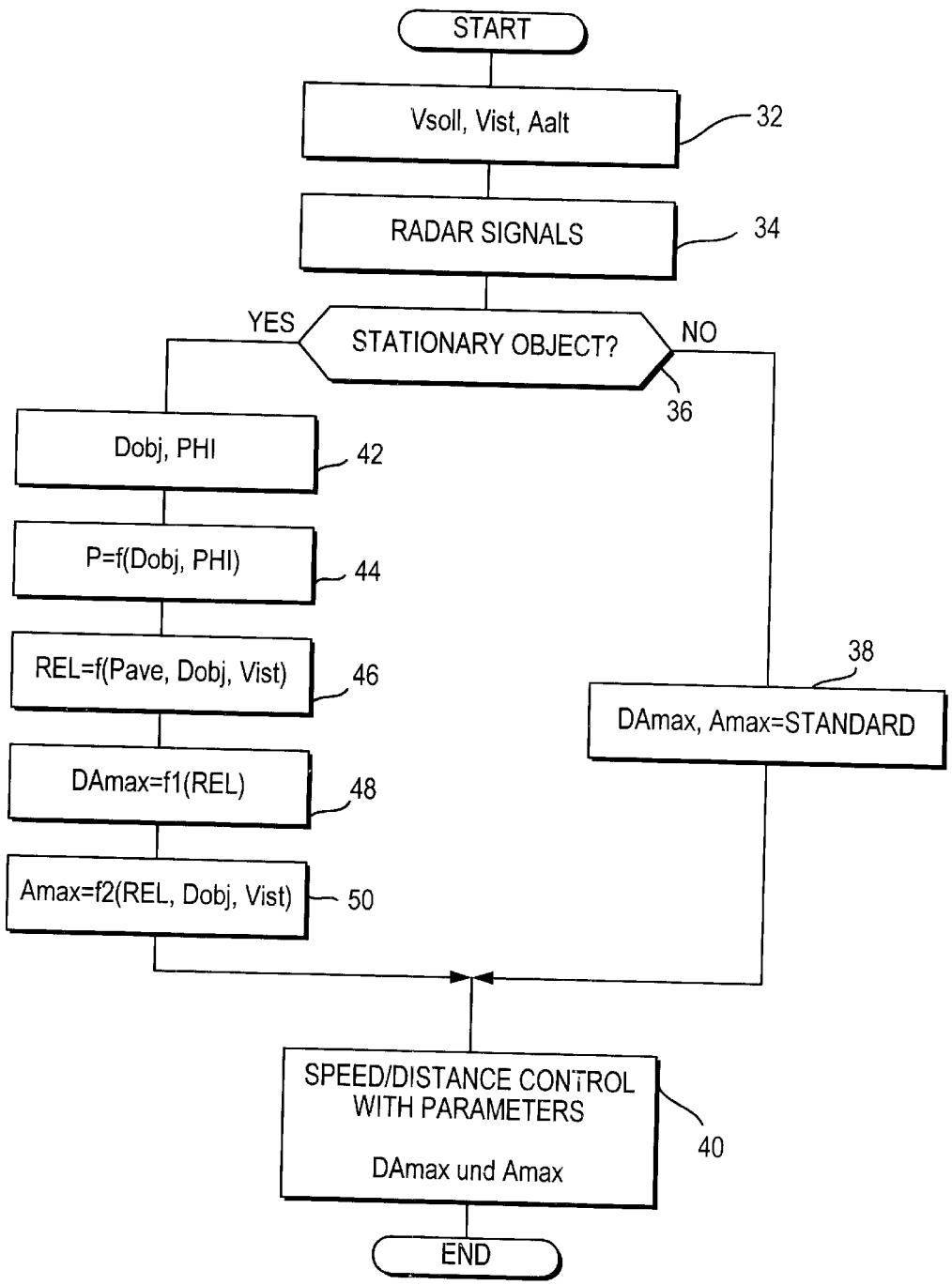
FIG. 2 is a flow chart of a program, which operates in a microcomputer shown in the apparatus of FIG. 1, for performing the method for controlling vehicle travel speed according to the invention.

The microcomputer 14 periodically executes a program, whose steps are described in connection with FIG. 2. The necessary operational data for the vehicle, especially the predetermined set vehicle speed Vsoll, the measured actual vehicle speed Vist and the previous value Aalt for the acceleration of the vehicle are read at the beginning of the current program cycle or loop and stored for use during the current program cycle. The acceleration value Aalt can be directly measured or else derived from the measured actual speed values. However the set value input to the adjusting device 30 in the previous program execution can also be used.

The radar signals collected by the distance-measuring device 24 are obtained in step 34. The radar unit has a moving and/or multi-beam radar sensor, which is equipped to determine the distance to an object reflecting the radar signals, the angle PHI to the object and the relative speed of the object (with the aid of the Doppler effect) from the reflected radar signals.

In the program step 36 the absolute speeds of the detected objects (only the component of the speed in the travel direction) are determined with the aid of the actual speed of the vehicle and the relative speeds of the detected objects. Whether or not at least one of these objects is a stationary object is also tested at this point. If no stationary object is detected, two parameters DAmax and Amax are set to their respective standard values in step 38, which are either fixed or determined by other operating parts of the vehicle speed control unit The parameter DAmax represents an upper limiting value for the increase of acceleration of the vehicle and the parameter Amax represents an upper limiting value for the acceleration of the vehicle. These parameters are used in a following program step sequence 40, whose individual steps will be described later in more detail with the aid of FIG. 3.

If the presence of at least one stationary object is established in the step 36, the program branches to a step 42 in which the coordinates Dobj and angle PHI of the stationary object are read in and stored. The coordinates Dobj give the actual distance of the object from the vehicle and PHI the direction to this object so that the position of the object in a plane polar coordinate system is then known with a predetermined accuracy. When many stationary objects are detected, the coordinates of each object are detected and also evaluated in the program branch described in more detail hereinbelow. The high repetition frequency of the program executed in the microprocessor 14 guarantees that the various objects can be detected and differentiated from each other in following program loops or cycles based on the similarities of their coordinates.

A probability value P is calculated in step 44 for each coordinate pair (Dobj, PHI) by searching in a table or with the help of a computation formula. This probability value P gives the probability that the object is on a predicted travel path, on which the vehicle is expected to move. The probabilistic nature of this parameter results from the fact that the location coordinates and the expected vehicle travel path are known only with limited accuracy. In the simplest case the predicted travel path extends in front of the vehicle and straight in the direction of travel. However a curved predicted travel path could be calculated with the aid of additional operating data, such as steering wheel input or transverse acceleration as well as further information. The more the location of the object is on the center of the travel path, the greater the probability value P.

An integrated value or a moving average Pave is then calculated from the probability value P calculated in step 44 and from corresponding values which were calculated in earlier program executions or cycles in the following step 46. A relevance value REL, which is a measure of or whether or not the detected object is relevant as a possible obstacle, is calculated from this moving average Pave and also with the aid of the object distance Dobj and the actual speed Vist of the vehicle in step 46. This calculation of the relevance value REL is performed either by looking up in a table or with the help of a computation algorithm. The greater the cumulative or average value Pave, the greater the relevance value.

The object distance Dobj and the vehicle speed Vist effect the relevance value in the simplest case only by providing threshold values. This means that the relevance value REL is set to 0 when the object distance is greater than a predetermined critical spacing and similarly, when the actual vehicle speed is greater than a predetermined speed threshold value. Because of this feature in this embodiment very far objects are not considered to be relevant. Also these objects are not considered during vehicle speed regulation when the vehicle speed is very high, for example on an expressway or high-speed highway. In other more complex embodiments the object distance and the vehicle speed can however be taken into consideration in different ways by calculating relevance value REL. It is also conceivable to weight probability values determined one after the other with the associated object distances Dobj and/or the associated actual vehicle speeds Vist during the integration to find the Pave. The weighting according to vehicle speed takes place by integration over the vehicle's previously traveled path instead of integration over time. Still other possibilities exist for considering other measured variables, such as radar echo intensity, during calculation of the relevance value REL.

A standard deviation value for the parameter DAmax is calculated in step 48 from the relevance value REL determined in step 46 according to a certain operational prescription. A value for the maximum permissible acceleration Amax is calculated in step 50 with the aid of the relevance value REL, preferably according to computational formula:

$$Amax = k*(1-REL)+c, \quad (1),$$

Wherein k and c are constants and $0 \leq REL \leq 1$. The constants c can, for example, depend optionally on Dobj and Vist. The dependence is then controlled by safety considerations, which means that only smaller and if necessary still negative accelerations are permitted with small object distances and/or high speeds.

According to the results of the test in step 36 either the standard values or the values determined in steps 48 and 50 are used for the parameters DAmax and Amax in program step 40.

Figure 3:
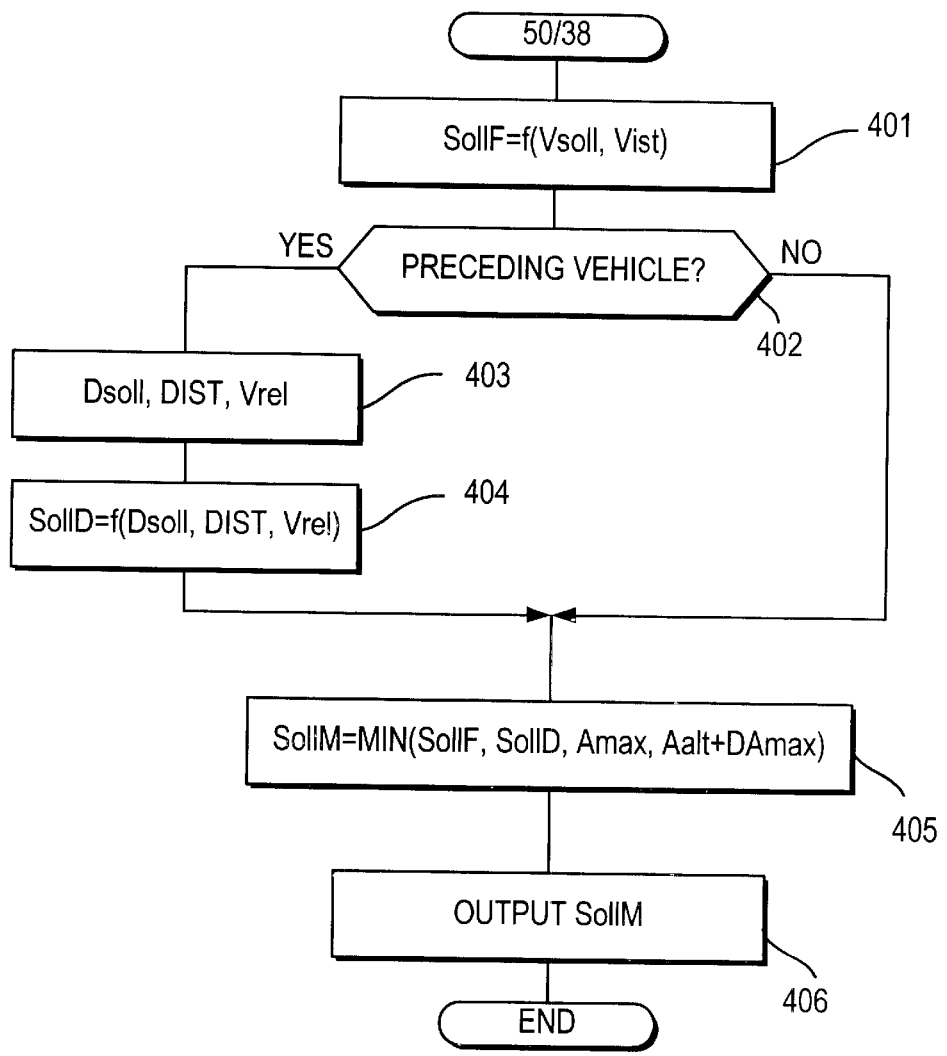
FIG. 3 is a more detailed flow chart of a portion of the program, which is shown in FIG. 2, including individual steps of the method.

As shown in FIG. 3 a preliminary set value SollF for the set acceleration of the vehicle is calculated within the program portion 40 in step 401 by comparison of the actual speed of the vehicle with the set speed given by the driver. In step 402 whether or not a preceding vehicle is present is established with the aid of the radar signals and when several preceding vehicles are present the immediately preceding vehicle is identified.

When a preceding vehicle is present a distance control occurs in steps 403 and 404. During this distance control the spacing of the controlled vehicle to the preceding vehicle is controlled according to a predetermined set distance value Dsoll. In other cases a vehicle speed control at a desired speed selected by the operator of the vehicle occurs with the help of the set value SollF calculated in step 401. In step 403 the predetermined set distance value Dsoll, the measured distance Dist to the preceding vehicle and the measured relative speed Vrel of the preceding vehicle relative to the controlled vehicle are read or input. In step 404 a preliminary set value SollD for the vehicle acceleration to be used in the distance control is determined from these values in the usual manner for the distance control.

The smallest value is selected from the group of values SollF, SollD, Amax and Aalt+DAmax in step 405. If several stationary objects were detected in step 36, their own values Amax and their own values DAmax are calculated for each of these stationary objects. Then the quantity from which the minimum value is determined in step 405 contains an appropriate number of values Amax and an appropriate number of sums Aalt+DAmax.

When the minimum of the quantity results from SollF, a pure speed control occurs. When the minimum of the quantity results from SollD, a distance control without consideration of stationary objects occurs, as long as the actual speed is under the set speed desired by the driver. When the minimum results from one of the values Amax, the acceleration is limited according to the presence of the particular stationary object. When the minimum of the quantity results from the sum Aalt+DAmax, the increase of the acceleration relative to the current value Aalt is limited to DAmax.

A proportionate acceleration or deceleration behavior of the vehicle is thus guaranteed in this way in all controlled travel situations.

The robustness of the system regarding erroneous consideration of stationary objects, which are not really obstacles, is further improved by consideration of additional relevance criteria. It is especially desirable when a detected stationary object is considered irrelevant and is ignored, if it is established that its measured position at some time was identical with the position of the immediately preceding vehicle with the help of the radar system. In that situation it is then certain that it was not a real obstacle to vehicle travel.

The disclosure in German Patent Application 100 15 300.3 of Mar. 28, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for controlling the travel speed of a vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A method of controlling travel speed of a controlled vehicle, said method comprising the steps of:
    a) controlling vehicle travel speed according to a set vehicle speed given by a driver of the controlled vehicle in a speed control mode;
    b) detecting at least one object present in front of the controlled vehicle and measuring distance to and relative speed of said at least one object when said at least one object is detected in front of the controlled vehicle during the detecting;
    c) determining whether or not a preceding vehicle is among said at least one object when said at least one object is detected during the detecting of step b);
    d) controlling the vehicle travel speed according to a set distance to said preceding vehicle in a distance control mode when said preceding vehicle is determined to be among said at least one object detected in front of said controlled vehicle in step c);
    e) establishing whether or not a stationary object is among said at least one object present in front of the controlled vehicle when said at least one object is detected during the detecting of step b);
    f) when a stationary object is found to be present in front of the controlled vehicle in step e), calculating a predicted travel path of the controlled vehicle and determining if the stationary object is located in the predicted travel path of the controlled vehicle;
    g) when the stationary object is determined to be in the predicted travel path of the controlled vehicle in step f), calculating a relevance value (REL) of said stationary object in the predicted travel path as an obstacle for the controlled vehicle;
    h) limiting vehicle acceleration of the controlled vehicle according to the relevance value (REL) of said stationary object as said obstacle; and wherein said relevance value (REL) of said stationary object as said obstacle is higher, the closer said stationary object is to a center of the predicted travel path of the controlled vehicle.

2. The method as defined in claim 1, wherein said calculating of the relevance value (REL) of said stationary object as said obstacle comprises considering a measured distance (Dobj) of said stationary object to said controlled vehicle.

3. The method as defined in claim 2, further comprising ignoring said stationary object and not limiting the vehicle acceleration of the controlled vehicle, when said measured distance of said stationary object to said controlled vehicle is greater than a predetermined distance threshold value.

4. The method as defined in claim 1, wherein said calculating of the relevance value (REL) of said stationary object as said obstacle comprises considering a time interval during which said stationary object is detected.

5. The method as defined in claim 1, wherein said calculating of said relevance value (REL) of said stationary object as said obstacle includes integrating or averaging a characteristic parameter (P) over time or over a previously traveled part of a travel track of the controlled vehicle and wherein said characteristic parameter (P) is a function of a position of said stationary object relative to said predicted travel path.

6. The method as defined in claim 1, wherein the limiting of the acceleration of the controlled vehicle includes limiting a rate of increase of said acceleration of the controlled vehicle to a predetermined upper limit (DAmax).

7. The method as defined in claim 1, wherein the limiting of the acceleration of the controlled vehicle includes limiting said acceleration to a positive or negative upper limit value (Amax).

* * * * *